US012786225B2

(12) United States Patent
Foster et al.

(10) Patent No.: US 12,786,225 B2
(45) Date of Patent: Nov. 3, 2026

(54) RISK SCORE GENERATION IN CLOUD ENVIRONMENTS

(71) Applicant: Horizon 3 AI, Inc., Dover, DE (US)

(72) Inventors: Joshua Foster, Ellicott City, MD (US); Robert Goyette, Santa Paula, CA (US)

(73) Assignee: Horizon 3 AI, Inc., Dover, DE (US)

(*) Notice: Subject to any disclaimer, the term of this patent is extended or adjusted under 35 U.S.C. 154(b) by 50 days.

(21) Appl. No.: 19/042,961

(22) Filed: Jan. 31, 2025

(65) Prior Publication Data

US 2026/0230490 A1 Aug. 6, 2026

(51) Int. Cl.
*H04L 9/40* (2022.01)

(52) U.S. Cl.
CPC ................................ *H04L 63/1433* (2013.01)

(58) Field of Classification Search
CPC .................................................. H04L 63/1433
USPC .......................................................... 726/25
See application file for complete search history.

(56) References Cited

U.S. PATENT DOCUMENTS

| | | | | |
|---|---|---|---|---|
| 11,503,061 | B1* | 11/2022 | Lin | H04L 63/102 |
| 2017/0098086 | A1* | 4/2017 | Hoernecke | G06F 11/3688 |
| 2019/0289029 | A1* | 9/2019 | Chawla | H04L 63/1425 |
| 2020/0233955 | A1* | 7/2020 | Ramzan | G06F 21/554 |
| 2022/0201042 | A1* | 6/2022 | Crabtree | H04L 63/1425 |
| 2022/0342690 | A1* | 10/2022 | Shua | G06F 9/5044 |
| 2023/0042671 | A1* | 2/2023 | Zaman | H04L 41/22 |
| 2023/0205891 | A1* | 6/2023 | Yellapragada | H04L 63/1416 726/25 |

* cited by examiner

*Primary Examiner* — Anthony D Brown
(74) *Attorney, Agent, or Firm* — Flare IP PLLC

(57) ABSTRACT

An autonomous pentesting agent may execute an autonomous pentest of a network associated with a cloud environment and generate risk scores. The autonomous pentesting agent may generate, during the autonomous pentest, a visual representation of relationships between the users in the cloud environment and of respective access privileges for each of the users, the respective access privileges indicating access to network assets of the network by respective users via the cloud environment. The autonomous pentesting agent may generate, during the autonomous pentest and without compromising the users, risk scores for the users, where each risk score is based on a projected attack path from a respective user to a compromise event and on a severity of the compromise event. The autonomous pentesting agent may output a network assessment report indicating security information of the cloud environment based on the risk scores for the users.

20 Claims, 7 Drawing Sheets

RISK SCORE GENERATION IN CLOUD ENVIRONMENTS

BACKGROUND

In networking, penetration testing or "pentesting" refers to conducting security operations that simulate a cybersecurity attack in order to identify vulnerabilities in a network. The goal of pentesting is to mimic the actions of a malicious actor and discover loopholes or other vulnerabilities before they can be exploited. Pentesting may include techniques such as scanning for vulnerabilities, testing system configurations and security protocols, and attempting controlled attacks to evaluate defense mechanisms within a network. Network administrators can remediate vulnerabilities uncovered during pentesting to prevent malicious actors from compromising network security using those vulnerabilities. Practicing regular pentesting can aid in maintaining high security standards, protecting sensitive data, and ensuring the continuity of network services.

SUMMARY

The described techniques relate to improved methods, systems, devices, and apparatuses that support risk score generation in cloud environments.

A method for weighted risk score generation in a cloud environment by an apparatus is described. The method may include generating, during an autonomous penetration test of a network associated with the cloud environment, a visual representation of relationships between a plurality of users in the cloud environment and of respective access privileges for each of the plurality of users, the respective access privileges indicating access to a plurality of network assets of the network by respective users via the cloud environment, generating, during the autonomous penetration test of the cloud environment and without compromising the plurality of users, a plurality of risk scores for the plurality of users, wherein each risk score is based at least in part on a projected attack path from a respective user to a compromise event and on a severity of the compromise event, and outputting a network assessment report indicating security information of the cloud environment based at least in part on the plurality of risk scores for the plurality of users.

An apparatus for weighted risk score generation in a cloud environment is described. The apparatus may include one or more memories storing processor executable code, and one or more processors coupled with the one or more memories. The one or more processors may individually or collectively be operable to execute the code to cause the apparatus to generate, during an autonomous penetration test of a network associated with the cloud environment, a visual representation of relationships between a plurality of users in the cloud environment and of respective access privileges for each of the plurality of users, the respective access privileges indicating access to a plurality of network assets of the network by respective users via the cloud environment, generate, during the autonomous penetration test of the cloud environment and without compromising the plurality of users, a plurality of risk scores for the plurality of users, wherein each risk score is based at least in part on a projected attack path from a respective user to a compromise event and on a severity of the compromise event, and output a network assessment report indicating security information of the cloud environment based at least in part on the plurality of risk scores for the plurality of users.

Another apparatus for weighted risk score generation in a cloud environment is described. The apparatus may include means for generating, during an autonomous penetration test of a network associated with the cloud environment, a visual representation of relationships between a plurality of users in the cloud environment and of respective access privileges for each of the plurality of users, the respective access privileges indicating access to a plurality of network assets of the network by respective users via the cloud environment, means for generating, during the autonomous penetration test of the cloud environment and without compromising the plurality of users, a plurality of risk scores for the plurality of users, wherein each risk score is based at least in part on a projected attack path from a respective user to a compromise event and on a severity of the compromise event, and means for outputting a network assessment report indicating security information of the cloud environment based at least in part on the plurality of risk scores for the plurality of users.

A non-transitory computer-readable medium storing code for weighted risk score generation in a cloud environment is described. The code may include instructions executable by one or more processors to generate, during an autonomous penetration test of a network associated with the cloud environment, a visual representation of relationships between a plurality of users in the cloud environment and of respective access privileges for each of the plurality of users, the respective access privileges indicating access to a plurality of network assets of the network by respective users via the cloud environment, generate, during the autonomous penetration test of the cloud environment and without compromising the plurality of users, a plurality of risk scores for the plurality of users, wherein each risk score is based at least in part on a projected attack path from a respective user to a compromise event and on a severity of the compromise event, and output a network assessment report indicating security information of the cloud environment based at least in part on the plurality of risk scores for the plurality of users.

DETAILED DESCRIPTION

Figure 1:
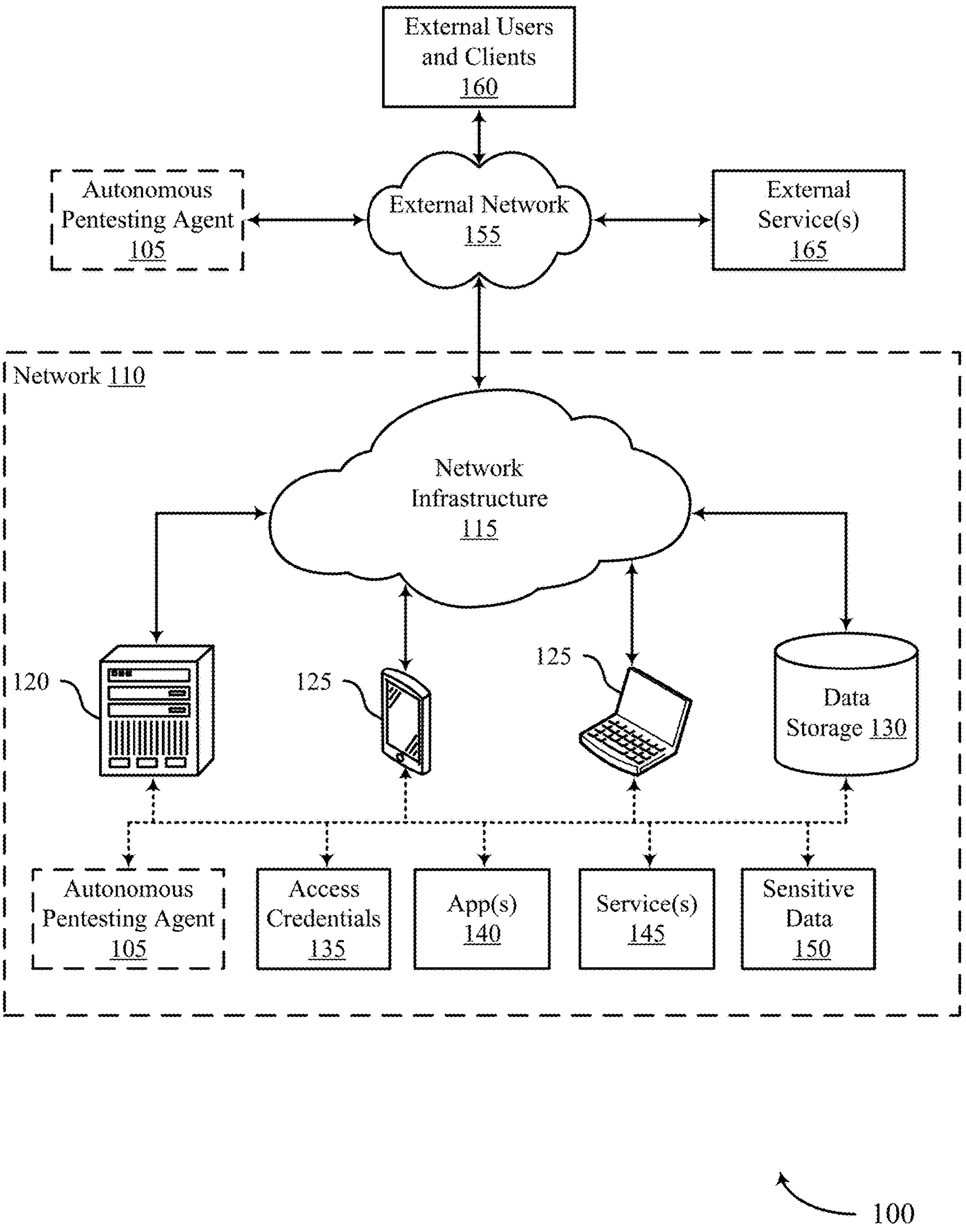
FIG. 1 shows an example of a computing environment that supports risk score generation in cloud environments in accordance with aspects of the present disclosure.

In some computing environments, a user may configure privileges for other users. For example, a network including multiple users may include one or more users having administrative privileges and such users may be referred to as administrators. An administrator may allocate, for at least some of the other users, privileges to access network assets of the network. For instance, the administrator may define which network assets are accessible to each user, groups that each user is a part of, groups each user is able to control, or the like. As used herein, "privileges" may refer to functions performable by a user, network assets accessible by a user, or both in accordance with a policy of the network or organization. In some cases, an administrator may misconfigure privileges for users. That is, the administrator may configure a user with privileges that are unused by the user, may fail to configure a user appropriate or sufficient privileges, or both. As an example, the administrator may configure a user with access to an application that the user does not use or require for their role within the network. Such misconfigurations may be associated with a misalignment in expected impact of security events compared to actual impact of security events. That is, because the administrator may inaccurately understand the user to have some set of privileges, but the user has been misconfigured, the administrator may fail to identify a security vulnerability that is associated with the misconfigured privileges.

As described herein, privileges of users within a network and associated security vulnerabilities may be identified via autonomous pentesting. For example, during an autonomous pentest, an autonomous pentesting agent may compromise least one user of the network or a tenant environment of a cloud platform (Microsoft Azure, Microsoft Entra, Amazon Web Services, etc.) having read privileges into the tenant environment. Through this read access, the autonomous pentesting agent may identify relationships between users of the network, as well as privileges of those users. For example, the autonomous pentesting agent may generate a visual representation, such as a graph or a map, of the tenant environment using the read privileges of the compromised user. Based on the visual representation, the autonomous pentesting agent may project attack paths to compromise events and assign risk scores to each user. For example, the risk scores may be based on one or more types of compromise events that may be achieved based on compromising the user, complexity of access to network assets within projected attack paths, or both. By compromising as few as one user of the network and using the read privileges into the tenant environment of the cloud platform, the autonomous pentesting agent may evaluate security risks for multiple or all of the users of tenant environment of the network without having to comprise each of the users for which security risks are evaluated. The autonomous pentesting agent may output security information of the tenant environment that is based on the risk scores, which may be used to identify and recommend correction of misconfigured privileges for users within a given tenant.

FIG. 1 illustrates an example of a computing environment 100 that supports risk score generation in cloud environments in accordance with aspects of the present disclosure. The computing environment 100 may include an autonomous pentesting agent 105 that performs an autonomous pentest of a network 110. The network 110 may include one or more devices or systems, such as a network infrastructure 115, server 120, computing devices 125, data storage 130, or any combination thereof. The devices or systems of the network 110 may be configured to access or provide various network information and services, such as access credentials 135, app(s) 140, service(s) 145, sensitive data 150, or any combination thereof.

The network 110 may allow the server 120, the computing devices 125, and the data storage 130 to communicate (e.g., exchange information) with one another. For example, the network infrastructure 115 may include any quantity of communications links and any quantity of hubs, bridges, routers, switches, ports, or other physical or logical network components that support communication between the server 120, computing devices 125, and data storage 130 of the network 110 as well as communication between the network 110 (e.g., the private network) and an external network 155 (e.g., the Internet). The network 110 may include aspects of one or more wired networks, one or more wireless networks (e.g., cellular networks), or any combination thereof. The network 110 may include aspects of one or more public networks or private networks, as well as secured or unsecured networks, or any combination thereof. For example, the network 110 may be an example of a private network that includes one or more public-facing or external assets that are accessible via an external network 155. As an example, the external network 155 may refer to the Internet, and users, such as external users and clients 160, may access the network 110 via the external network 155 through a website or application that is on the external network 155. For example, the external users and clients 160, the external service(s) 165, or both may access network information and services via the external network 155 (e.g., via the Internet), including the access credentials 135, app(s) 140, service(s) 145, and sensitive data 150.

The network 110 may be accessible via one or more hosts. For example, hosts may be examples of real or virtual machines that are connected to and capable of accessing the network 110. Real machines may refer to machines having or made up of hardware components including a central processing unit (CPU), memory, hard drive, or the like, such as physical or tangible computers or servers (e.g., the server 120, the computing devices 125, etc.). Virtual machines may refer to software within or running on a physical computer or server using portions of the CPU, memory, hard drive, or the like of the physical computer or server. A physical computer or server may include or support multiple virtual machines, such as multiple tenants (e.g., in a multi-tenant environment). The server 120 and the computing devices 125 may be examples of hosts. Hosts may communicate data with other devices within the network 110 and outside of the network (e.g., with devices in an external network 155). For example, the server 120 may send data to and receive data from one or more of the computing devices 125. Additionally, or alternatively, hosts may access resources of the network 110, including the access credentials 135, app(s) 140, service(s) 145, or sensitive data 150. As used herein, hosts may refer to web hosts, cloud hosts, virtual hosts, remote hosts, or the like.

Hosts may be examples of and include network assets. For example, a host may be an example of a type of network asset that has access to other network assets, such as applications, services, and resources. As used herein, network assets refer to machines that include network shares. For example, network assets may be examples of machines (e.g., real or virtual machines) that include shares of the network 110, such as file sharing systems. Network assets may be obtained and utilized by attackers to compromise the network 110. The server 120, the computing devices 125, the data storage 130, and the access credentials 135, app(s) 140, service(s) 145, and sensitive data 150 accessible via the devices and systems of the network 110 may all be examples of network assets. For example, physical devices (e.g., servers, computing devices, data storage, etc.) and systems may be considered network assets as well as information, apps, and services accessible through physical devices and systems of the network 110.

Hosts may store, provide, or implement access credentials 135, app(s) 140, service(s) 145, sensitive data 150, or any combination thereof. In some cases, computing devices 125 on the network may access the one or more assets (e.g., access credentials 135, app(s) 140, service(s) 145, sensitive data 150, etc.) via the server 120 (e.g., via a host). Additionally, or alternatively, computing devices 125 may locally store or otherwise access the one or more assets of the network 110. For example, users of the network 110 may access app(s) 140 and service(s) 145 via the computing devices 125 directly or indirectly (e.g., via a connection between the computing devices 125 and the server 120).

The autonomous pentesting agent 105 may perform a pentest of the network 110. As used herein, a penetration test or a "pentest" may refer to one or more security operations that simulate a cybersecurity attack in order to identify vulnerabilities in the network 110. The autonomous pentesting agent 105 may perform the pentest of the network 110 using one or more artificial intelligence (AI) models. For example, the autonomous pentesting agent 105 may be "autonomous," as the autonomous pentesting agent 105 may perform the pentest without a requirement of hard-coding, user inputs, or the like and, instead, by using the one or more AI models. The autonomous pentesting agent 105 may identify, via the pentest, security vulnerabilities of the network 110. An example of an output of the pentest may be described in greater detail elsewhere herein, including with reference to FIG. 2.

The autonomous pentesting agent 105 may, via the one or more AI models, determine and implement an attack path for a pentest. For example, the autonomous pentesting agent 105 may identify or select an asset of the network 110 to attempt to access initially and, from that asset, another asset to attempt to access, and so on. In other words, the autonomous pentesting agent 105 may use the one or more AI models to mimic decisions of an attacker. The one or more AI models may output a targeted asset of the network 110 to be subject to an access attempt by the autonomous pentesting agent 105 based on inputs including context of various assets in the network 110. In other words, the one or more AI models may output targeted assets based on the relative position of assets within the network 110, asset types, downstream assets (e.g., accessible after or through accessing a targeted asset), or the like.

The one or more AI models may be trained using data of previous pentests of the network 110 or other networks. For example, an autonomous pentesting service that deploys the autonomous pentesting agent 105 may train one or more AI models used by the autonomous pentesting agent 105 using tactics, techniques, and procedures (TTPs) of attackers (e.g., human or automated pentests), autonomous pentests performed on the network 110 previously or on other networks, or both. The autonomous pentesting agent 105 may perform improved pentests after the one or more AI models are trained using previous pentests of the network 110. That is, as the autonomous pentesting agent 105 learns more about the network 110, the autonomous pentesting agent 105 may perform pentests with higher performance levels (e.g., higher accuracy, higher quantities of potential attack paths, etc.).

In some cases, the pentest may be internal or external to the network 110. For example, the autonomous pentesting agent 105 may be deployed at a host device of the network 110 (e.g., deployed to the server 120 or computing devices 125). In such examples, the autonomous pentesting agent 105 may perform the pentest as an internal user of the network 110. Such internal pentests may be indicative of or emulate internal security threats to the network, such as from employees of an organization or an attacker that has otherwise obtained access to the network 110 internally. Alternatively, the autonomous pentesting agent 105 may be deployed at the external network 155. For example, the autonomous pentesting agent 105 may perform the pentest as an external user of the network 110, such as by accessing external or public-facing assets of the network 110 on the external network 155.

By performing the pentest autonomously via the autonomous pentesting agent 105, techniques described herein may support improved performance related to speed, identification of security vulnerabilities, and provision of remediation measures. For example, the pentest, when performed autonomously using the autonomous pentesting agent 105, may support improved performance and, by extension, improved security of the network 110 against cybersecurity attacks relative to hard-coded (e.g., automated) or manual (e.g., human operated) pentests.

Techniques described herein may support improved network and cloud security via autonomous pentesting. For example, autonomous pentesting described herein may support improved identification of privilege misconfigurations for users in a tenant environment of a cloud platform. For example, by compromising a user having a read privilege to the tenant environment and generating a visual representation of the tenant environment, the autonomous pentesting agent 105 may identify one or more security vulnerabilities, users having relatively high risk scores, misconfigured privileges, or the like. Outputting network and/or cloud assessment reports indicative of this information may support changes to network and/or cloud security policies that are more effective, such as relative to manual pentesting, manual review of user privileges or the network and/or cloud security policies, or both.

Additionally, by leveraging the read privilege of the compromised user to generate the visual representation and assign risk scores without actual compromise of other users, techniques described herein may support improved performance of autonomous pentesting. For example, an autonomous pentest involving projections of attack paths rather than actual performance of the attack paths may reduce a duration of an autonomous pentest, resources used to perform the autonomous pentest, or both. Specifically, by projecting attack paths to identify which users have inappropriate permissions (e.g., and associated security vulnerabilities or weaknesses), the autonomous pentest described herein may avoid injecting individual user credentials for each user of a network, which may be burdensome to the autonomous pentesting agent 105 and, therefore, delay the pentest. Accordingly, techniques described herein may provide security information associated with tenant environments of cloud platforms with improved efficiency (e.g., with respect to time and resources) relative to other pentesting methods, including automated or manual pentesting.

Figure 2:
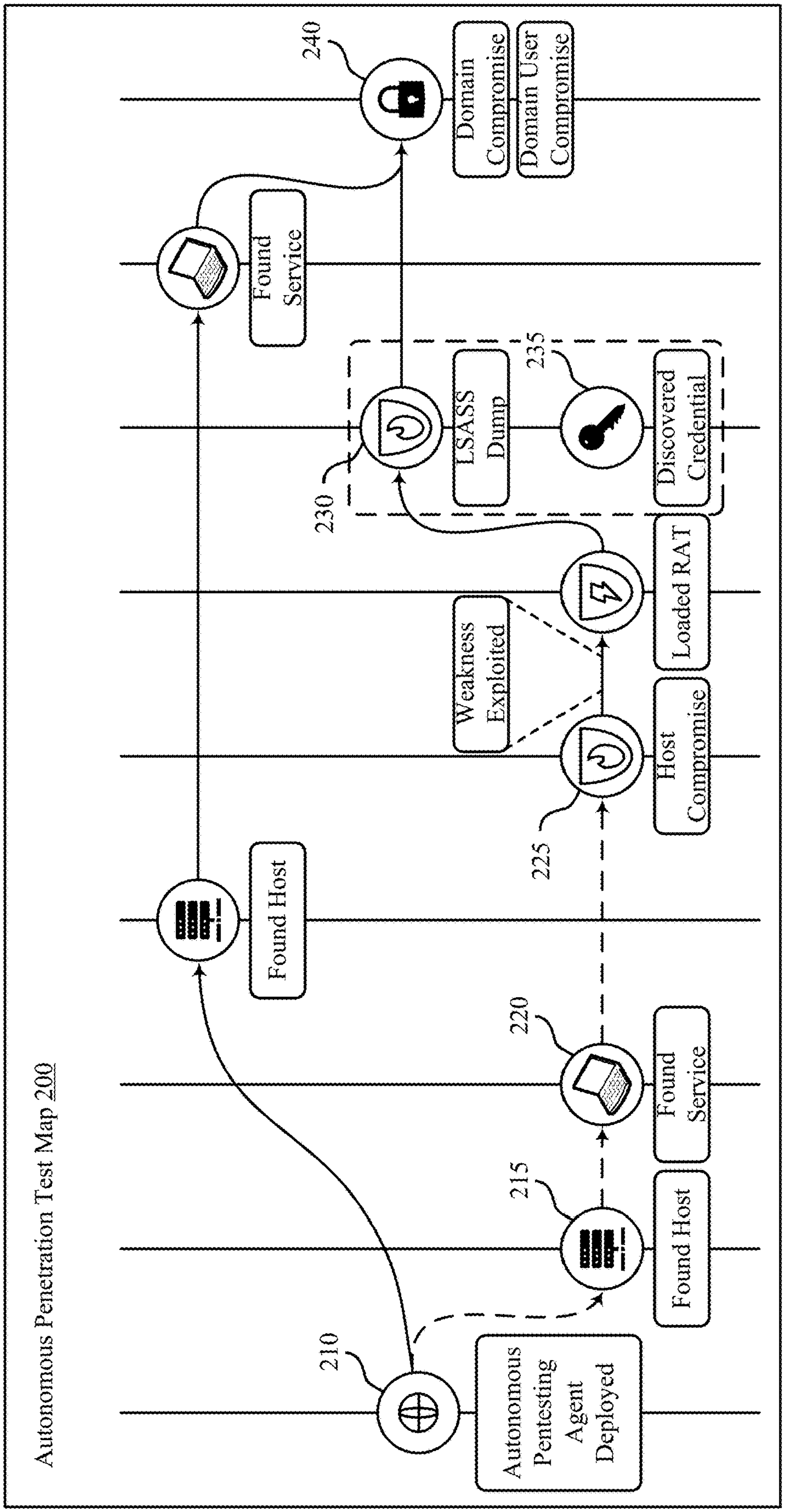
FIG. 2 shows an example of an autonomous pentest map that supports risk score generation in cloud environments in accordance with aspects of the present disclosure.

FIG. 2 shows an example of an autonomous pentest map 200 that supports risk score generation in cloud computing environments in accordance with aspects of the present disclosure. The autonomous pentest map 200 may be an example of an output or result of an autonomous pentest performed by an autonomous pentesting agent, such as a pentest performed by the autonomous pentesting agent 105 in the network 110 as described with reference to FIG. 1. The autonomous pentest map 200 may illustrate and describe an example of events of a pentest, including operations performed by and information obtained by the autonomous pentesting agent.

The autonomous pentest map 200 may include one or more types of events. For example, the autonomous pentest map 200 may include deployment 210 (e.g., of the autonomous pentesting agent), host identification 215, service identification 220, host compromise 225, deployment of an attacker tool 230 (e.g., a remote access tool (RAT), credential identification 235, and access 240 (e.g., to a domain, a domain user, or both). The autonomous pentest map 200 includes one possible attack path including two attack branches that is generated based on an autonomous pentest. However, it is understood that any quantity of possible attack paths having any quantity of possible attack branches may be output from an autonomous pentest. In other words, the autonomous pentest map 200 may include one or more attack paths having one or more respective attack branches. In some cases, dozens, hundreds, or thousands of possible attack paths, branches, or both may be generated based on the autonomous pentest. Additionally, it is understood that while the autonomous pentest map 200 shown in FIG. 2 displays one example of an autonomous pentest for illustration, other maps including various different events, hosts, attack paths, and attack branches may result from various autonomous pentests.

In the example of the autonomous pentest map 200, the autonomous pentesting agent may identify an attack path having two attack branches. As used herein, attack "path" may be understood to refer to a series of events, set in motion by the autonomous pentest agent, that lead to a compromise of one or more components or assets of a network. Additionally, "branches" or "chains" of an attack path may refer to one or more events occurring simultaneously or in parallel that lead to the compromise. As an example, in a first attack branch of the autonomous pentest map 200, the autonomous pentesting agent may identify a host, identify a service, and compromise the host (e.g., through the service). On the compromised host, the autonomous pentesting agent may exploit a weakness identified on the service running on the host to load a RAT and remotely control the compromised host. The autonomous pentesting agent pay perform, via the RAT, a Local Security Authority Subsystem Service (LSASS) dump, allowing the autonomous pentesting agent to discover a credential. The autonomous pentesting agent may use the credential in a different branch of the attack path. For example, in a second attack branch of the autonomous pentest map 200, the autonomous pentesting agent may identify a host and, through the identified host, a service. The autonomous pentesting agent may use the discovered credentials (e.g., of the first attack branch) at the service (e.g., of the second attack branch to obtain access 240 to the domain, domain user, or both.

An autonomous pentesting service may display the autonomous pentest map 200 such that compromised assets may be identified and security measures may be put in place. In some cases, the autonomous pentesting service may provide mitigation recommendations according to the autonomous pentest map 200. As an example, the autonomous pentest map 200 may identify a particular host or service as a security vulnerability for a network by tracing the access 240 backwards to a host identification 215 event. Accordingly, the autonomous pentesting service may provide a mitigation recommendation to be applied to the host involved in the host identification 215 event, such as according to how the host was identified or how access was obtained to the host at the host compromise 225 event. Similarly, the autonomous pentesting service may provide a mitigation recommendation to be applied to the service involved in the service identification 220 event.

The autonomous pentesting service described herein may generate a projection of the autonomous pentest map 200. For example, by compromising a single user (or a subset of users) having read privileges, the autonomous pentesting service may generate a visual representation of other users (or all of the users) of a cloud and their associated permissions. Viewing the permissions of each user may allow the autonomous pentesting service to project attacks that may be performed but are not actually performed during an autonomous pentest. As used herein, viewing the permissions of a "user" may refer to viewing permissions of a user account on a cloud platform. For example, a user may refer to a service account that involves access by multiple people. Viewing the permissions of each user may allow the autonomous pentesting service to map out resources accessible to each user (e.g., user account) and risk associated with the resources. The risk associated with the resources may be used to calculate risk of users that can access the resources.

Figure 3:
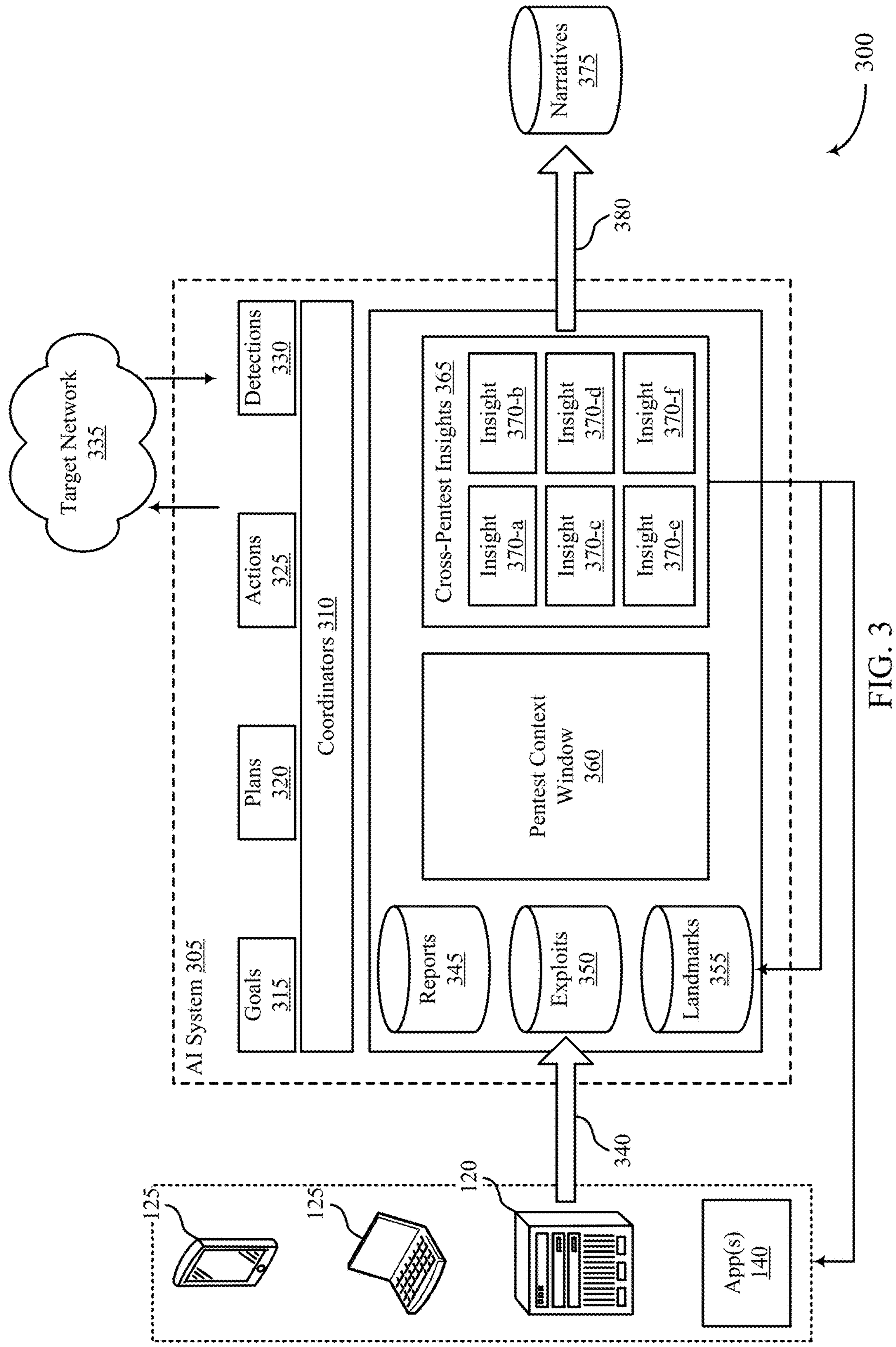
FIG. 3 shows an example of a computing environment that supports risk score generation in cloud environments in accordance with aspects of the present disclosure.

FIG. 3 shows an example of a computing environment 300 that supports risk score generation in cloud environments in accordance with aspects of the present disclosure. The computing environment 300 may implement or be implemented by the computing environment 100, the autonomous pentest map 200, or both. For example, the computing environment 300 may illustrate servers 120, computing devices 125, and app(s) 140 utilizing an AI system 305 to perform autonomous pentests.

In some examples, the AI system 305 may be a system designed to process data, learn from past experiences, and make determinations and predictions that mimic human cognitive functions. In some cases, the AI system 305 may implement or be implemented by one or more AI or machine learning (ML) models (e.g., AI/ML models). In some examples, an AI/ML model of the AI system 305 may be a supervised learning model configured to learn from labeled training data to generate predictions on inputs. In some other examples, an AI/ML model of the AI system 305 may be an unsupervised learning model that is configured to discover patterns in unlabeled data to generate predictions on inputs. In another example, the AI system 305 may implement reinforcement learning models that are configured to learn behaviors through trial-and-error (e.g., via experimentation). Additionally, or alternatively, the AI system 305 may implement neural networks (e.g., artificial neural networks (ANNs)) that include one or more layers configured to process information via a series of mathematical transformations.

Deep learning models may be a subset of neural networks designed and configured for tasks such as computer vision and natural language processing. In some examples, the AI system 305 may utilize a large language model (LLM) which utilizes a neural network architecture to process, understand, and generate natural language. For example, LLMs may be trained on a relatively large corpus of data (e.g., text data, image data, audio data, video data, among others) to perform natural language processing tasks such as text generation, translation, summarization, responding to natural language queries, data generation, or any combination thereof.

The AI system 305 may be an agentic AI system, meaning that the AI system 305 may act autonomously, at least for some operations, to achieve specified goals, make decisions, and take actions without direct human intervention (e.g., through the use of AI agents). In some cases, the AI system 305 may be an agentic AI system with limited human involvement where the AI system 305 may request human guidance or user input only in certain circumstances, such as if the AI system 305 is unable to make a decision or perform a subsequent operation. Further, the AI system 305 may use one or more AI/ML models to set and pursue goals 315 without those goals 315 being specifically defined by human input to the AI system 305. The AI system 305 may further generate plans 320 and execute sequences of actions 325 to achieve those goals 315 and adapt future behavior in accordance with real-time observations and feedback about the effectiveness of the actions 325 to achieve the desired outcomes or meet targets.

For example, in some cases, utilizing one or more AI/ML models, the AI system 305 may interface with one or more coordinators 310 that coordinate goals 315 and plans 320, actions 325, and detections 330 for achieving the goals 315. For example, for autonomous pentesting, the goals 315 of the AI system 305 may be to obtain access to data stored within a network 110, compromise (such as by obtain unauthorized administrative access or deploying unauthorized software to) a domain or a network asset of the network 110, or any combination thereof. To obtain the goals 315, the AI system 305 may generate one or more plans 320 that are based on actions 325 and detections 330. For example, to determine a next best action within a defined set of guardrails or instructions, the AI system 305 may generate a plan 320 that can include an action 325 to invoke (e.g., execute) one or more commands on a target network 335 to obtain a detection 330 from the target network 335.

In some examples, the target network may include one or more network assets such as servers 120, computing devices 125, data storages 130, app(s) 140, or any combination thereof. Further, obtaining a detection 330 from the target network 335 may include the AI system 305 retrieving telemetry data from the one or more network assets of the target network 335. In some cases, telemetry data obtained from the target network 335 may include logs, traces, metrics, events, or any combination thereof from the one or more network assets of the target network 335. For example, a detection 330 may include some data that is obtained from the target network 335 via an autonomous pentest that aids the AI system 305 in achieving the goals 315. In one example, the detection 330 may include an autonomous pentest obtaining a credential that is used to gain unauthorized access to a network asset, which may be an example of one of the goals 315. In another example, a detection 330 may be the autonomous pentest detecting a set of patterns of events indicated within logs of the target network 335, which may be utilized for achieving a respective goal 315. For example, a goal 315 may be to perform a successful credential compromise attack to gain unauthorized access to a network asset and a detection 330 may indicate information to aid an autonomous pentesting agent in performing the credential compromise attack.

In some examples, the AI system 305 may also interface with the coordinators 310 to perform autonomous pentests as described elsewhere herein, such as with reference to FIGS. 1 and 2. When performing autonomous pentests, the AI system 305 may collect and store a relatively large quantity (such as thousands, millions, or billions) of training data points or tokens for the AI system 305 to perform subsequent autonomous pentests. For example, each action 325 (e.g., command) executed via the AI system 305 may result in a collection of a relatively large quantity of training data points that indicate whether the action 325 succeeded or failed, why the action 325 succeeded or failed, which software, policies, or tools were used to execute the action 325 thar resulted in the action 325 succeeding or failing, or any combination thereof. Therefore, the AI system 305 may continuously obtain and update the training data used for training AI/ML models and perform reinforcement learning using collective intelligent to improve the weights and training of the AI/ML models.

In some examples, the training data for the AI system 305 may include telemetry data obtained from the target network 335, data obtained from servers 120, computing devices 125, and app(s) 140 via a developer pipeline 340, or both. In some cases, the training data may include indications of reports 345, exploits 350, and landmarks 355. A report 345 may indicate outputs or artifacts generated by the AI system 305 to document the discoveries, vulnerabilities, and results of an autonomous pentest. An exploit 350 may indicate the tools, techniques, operations, programs, code, and the like utilized by the AI system 305 to perform an autonomous pentest. A landmark 355 may indicate a point or marker within a network (e.g., the target network 335) to assist the AI system 305 to navigate and map a target environment during an autonomous pentest.

In some examples, the AI system 305 may obtain the reports 345, exploits 350, and landmarks 355 based on performing one or more autonomous pentests. In another example, one or more users (e.g., developers) may manually generate the reports 345, exploits 350, and landmarks 355 for training the AI system 305. In such cases, the one or more users may generate the data for the reports 345, exploits 350, and landmarks 355 and label the data for the AI system 305. Additionally, or alternatively, one or more users may utilize an LLM to generate the reports 345, exploits 350, and landmarks 355. For example, a user may prompt an LLM to generate the reports 345, exploits 350, and landmarks 355 by proving the LLM with a set of input parameters that indicate a scope, objectives, and constraints of an autonomous pentest. In some examples, the LLM prompt to generate the reports 345, exploits 350, and landmarks 355 may be a natural language prompt that includes instructions that indicates characteristics of the target network 335, testing protocols, compliance requirements, or any combination thereof. The LLM may then process the prompt and generate the reports 345, exploits 350, and landmarks 355 for training the AI system 305.

Utilizing the reports 345, exploits 350, and landmarks 355, the AI system 305 may perform one or more autonomous pentests by maintaining awareness of the current testing state and progress through a pentest context window 360. The pentest context window 360 may processes information about ongoing pentests, including successfully exploited vulnerabilities, accessed systems and data, attempted but failed exploit paths, among others.

In some examples, the AI system 305 may analyze contextual information obtained from performing autonomous pentests to generate cross-pentest insights 365 that can be applied across multiple pentesting operations. For example, as a result of training the AI system 305, one or more autonomous pentests, or both, the AI system 305 may generate a set of cross-pentest insights 365 that indicates one or more insights 370 (e.g., an insight 370-*a*, an insight 370-*b*, an insight 370-*c*, an insight 370-*d*, an insight 370-*e*, and an insight 370-*f*). For example, the insight 370-*a* may indicate patterns of vulnerable default configurations in commonly used enterprise software. In some other examples, the insight 370-*b* may indicate how compromised low-privilege user credentials can be leveraged to eventually gain domain admin access through privilege escalation techniques. Further, the insight 370-*c* and the insight 370-*d* may indicate common pathways where initial network access can lead to sensitive data exposure, such as finding unencrypted password files or accessing improperly secured cloud storage buckets. The insight 370-*e* may indicate recurring vulnerabilities in network segmentation that allow lateral movement between supposedly isolated systems. Additionally, or alternatively, the insight 370-*f* may indicate patterns where seemingly low-risk misconfigurations can be chained together to achieve relatively significant network compromise. Therefore, the cross-pentest insights 365 may indicate one or more insights 370 that represent patterns and vulnerabilities that occur across different networks and testing scenarios, helping organizations better understand systemic security weaknesses that need to be addressed. For example, the cross-pentest insights 365 may be added as landmarks 355 for further training the AI system 305 to perform autonomous pentests.

In some examples, the cross-pentest insights 365 may be displayed to one or more computing devices 125, app(s) 140, or both to enable users to view and analyze the cross-pentest insights 365 to generate additional TTPs configured to achieve the goals 315 of the AI system 305. To display the cross-pentest insights 365 to one or more users, the AI system 305 may generate one or more narratives 375 that indicate the insights 370 obtained in response to one or more autonomous pentests. In some examples, to generate the one or more narratives 375, the AI system 305 may output (e.g., transmit) the cross-pentest insights 365 via a pipeline 380 connected to a separate AI/ML model (e.g., an LLM). For example, the AI system 305 may output the cross-pentest insights 365 to an LLM that is configured to generate the narratives 375 (e.g., the LLM is finetuned for text generation based on an input of the insights 370). In some cases, the narratives 375 may indicate detailed security postures for organizations, companies, tenants, users, groups of users, or any combination thereof. For example, a narrative 375 may be a compliance narrative that indicates one or more insights 370 about the security compliance of a network 110. In another example, a narrative 375 may be a presentation for a company or organization that indicates the one or more vulnerabilities in a network 110 associated with the company or organization. For example, the presentation can indicate the cross-pentest insights 365 obtained from performing one or more autonomous pentests on the network 110 associated with the company or organization (e.g., the target network 335).

An autonomous pentesting service may utilize the AI system 305 to project attack paths, generate risk scores, or the like. For example, the autonomous pentesting service may generate risk scores vis the AI system 305 by providing permissions of respective users and relationships between users of a network to the AI system 305 as input. The AI system 305 may generate risk scores for each of the users based on the inputs and, in some examples, generate recommendations for security remediation.

Figure 4:
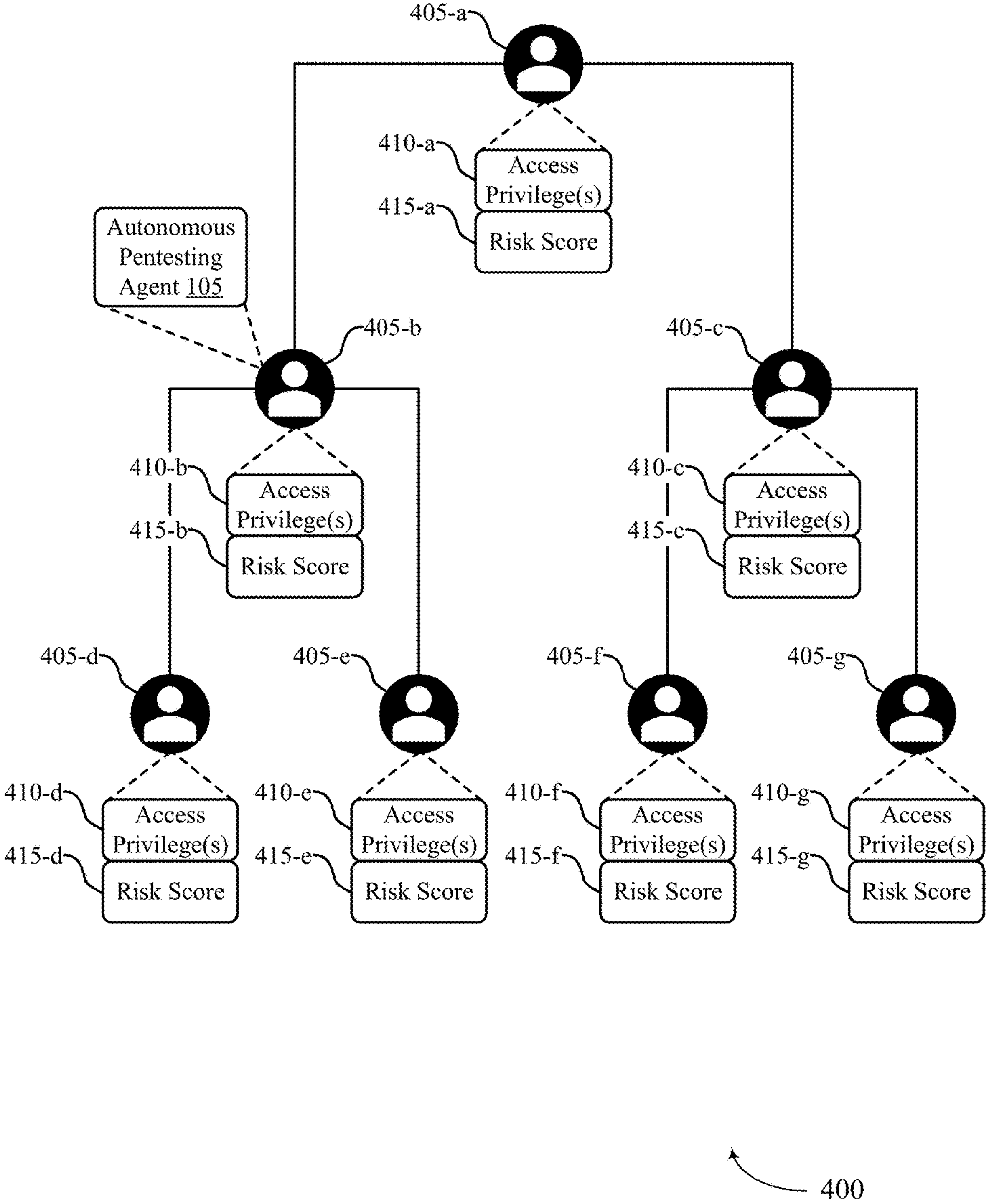
FIG. 4 shows an example of a cloud environment that supports risk score generation in cloud environments in accordance with aspects of the present disclosure.

FIG. 4 shows an example of a cloud environment 400 that supports risk score generation in cloud environments in accordance with aspects of the present disclosure. The cloud environment 400 may implement or be implemented by the computing environment 100, the autonomous pentest map 200, the computing environment 300, or any combination thereof. For example, the cloud environment 400 may illustrate performance of an autonomous pentest of a network by the autonomous pentesting agent 105.

The cloud environment 400 may be an example of a tenant environment of a cloud platform. For example, a cloud platform may be an example of an external service of a network, such as one of the external service(s) 165 of the network 110 as described with reference to FIG. 1. The cloud platform may provide cloud computing services to users of the network (e.g., as a cloud computing platform). For example, the cloud platform may allow users to access assets via an external network, such as via the Internet. That is, users may access storage, servers, databases, software, or the like via the external network and using the cloud platform. The cloud computing platform may include a multi-tenant infrastructure in which respective tenants support access to assets of different organizations. For example, the cloud platform may include a tenant environment that is separate from other tenant environments supported by the cloud platform. The cloud platform may be an example of Microsoft Azure, Microsoft Entra, Amazon Web Services, or the like.

Additionally, the cloud environment 400 may include users 405. The users 405 may be understood to be users of the tenant environment of the cloud platform. That is, the users 405 may be user accounts of the cloud platform for the tenant, where the users 405 are configured to access resources or assets of the tenant environment according to defined privileges associated with each user. For example, each user may be associated with access privilege(s) 410. That is, in the example of FIG. 4, a user 405-*a* may have access privilege(s) 410-*a*, a user 405-*b* may have access privilege(s) 410-*b*, a user 405-*c* may have access privilege(s) 410-*c*, a user 405-*d* may have access privilege(s) 410-*d*, a user 405-*e* may have access privilege(s) 410-*e*, a user 405-*f* may have access privilege(s) 410-*f*, and a user 405-*g* may have access privilege(s) 410-*g*.

In some cases, user compromise within the cloud environment 400 may lead to unauthorized access to network assets including data, devices, and resources, as well as to full network control. If a user is compromised by an attacker, the attacker may gain unauthorized access to assets within the cloud environment 400, which may lead to full cloud control (e.g., compromise of an entire cloud tenant or account). Improper configuration (e.g., misconfiguration) of the access privilege(s) 410 may lead to unexpected impacts, for example, when a user is unintentionally or incorrectly able to access resources that may lead to full domain control or a greater impact than expected. As used herein, an improper configuration or misconfiguration of access privilege(s) 410 may refer to a user having more privileges than intended by an administrator configuring the privileges.

An autonomous pentesting agent 105 may perform an autonomous pentest of the cloud environment 400 (e.g., a tenant environment of the cloud platform) that identifies misconfigurations in access privilege(s) 410. For example, the autonomous pentesting agent 105 may compromise at least one user and use read privileges of the at least one user to generate a visual representation of the cloud environment 400 and assign risk scores to users within the cloud environment 400.

In some examples, users may have read privileges, such as read-only privileges or visibility, into the cloud environment 400 (e.g., a tenant environment). For example, users may be able to at least view how they are related to other users and how other users relate to each other within the cloud environment 400. As an example, the user 405-*b* may view that they control the user 405-*d* and the user 405-*e* and are controlled by the user 405-*a*. Additionally, the user 405-*b* may view that the user 405-*a* controls the user 405-*c*, which controls the user 405-*f* and the user 405-*g*. That is, users may have privileges to view control hierarchies between users of the cloud environment 400. Additionally, users may view privileges of other users. For example, users may view group(s) that other users are included in, group(s) controlled by other users, services that other users are subscribed to, network assets controlled or accessible by other users, or the like.

The autonomous pentesting agent 105 may compromise a user having read privileges to generate the visual representation of the cloud environment 400. For example, the autonomous pentesting agent 105 may compromise the user 405-*b*. Using the read privileges of the user 405-*b*, the autonomous pentesting agent may generate a visual representation of users of the cloud environment 400 as well as their access privileges. That is, by compromising a single user within an Azure environment, the autonomous pentesting agent 105 may generate a visual representation that shows other users (e.g., users that are not compromised) and their access to network assets within the cloud environment 400.

The visual representation may be a map, a graph, or the like. For example, the visual representation may include nodes representative of users and network assets and lines therebetween indicating control and access relationships between the nodes (e.g., similar to the relationships between the users 405 in the cloud environment 400). Additionally, or alternatively, the autonomous pentesting agent 105 may generate a representation that is non-visual. For example, the autonomous pentesting agent 105 may generate a matrix or table that includes attributes indicative of relationships between users and access privileges. Put another way, the visual representation may be an example of storage of relational data (e.g., for human eyes, or readable by a computer or machine). That is, the visual representation may describe relationships between users and access privileges using data.

In some examples, the autonomous pentesting agent 105 may generate the visual representation in portions. For example, to generate the visual representation, the autonomous pentesting agent 105 may collect data (e.g., a JavaScript Object Notation (JSON)) descriptive of the relationships between the users and privileges of the users. In examples in which the collected data exceeds a threshold size, the autonomous pentesting agent 105 may separate the collected data into portions (e.g., chunks) such that the portions do not exceed the threshold size. For example, the autonomous pentesting agent 105 may generate the visual representation as a first part using a first portion of the data, a second part using a second portion of the data, and so on. The threshold size may be based on a processing capability or capacity of a device (e.g., a computing device or a server) used by the autonomous pentesting agent 105 to generate the visual representation. For example, the threshold size may be selected such that generation of the visual representation does not time out (e.g., does not exceed a threshold time).

The autonomous pentesting agent 105 may store and access the visual representation. For example, the autonomous pentesting agent 105 may, after generating the visual representation, store the visual representation at a temporary server (e.g., a BloodHound server) that may be destroyed after the visual representation is used. That is, the temporary server may be destroyed after the visual representation is used by the autonomous pentesting agent 105 to reduce a probability of unauthorized access to the visual representation (e.g., by preventing persistent storage of the visual representation). In some examples, the autonomous pentesting agent 105 may store a backup of the visual representation. For example, the autonomous pentesting agent 105 may store the backup at a secure storage location, such as an archive (e.g., a graph database management system archive, such as a neo4j archive).

The autonomous pentesting agent 105 may use the visual representation to project attack paths. For example, the autonomous pentesting agent 105 may identify potential attack paths beginning from each user and leading to one or more compromise events in accordance with the relationships between the users and the access privileges of each user. That is, the autonomous pentesting agent 105 may project, from each user, one or more attack paths leading to one or more compromise events, the one or more attack paths leveraging the relationships of the user with other users and access privilege(s) of the user. Put another way, because the visual representation shows relationships between the users and network assets of the cloud environment 400, the visual representation may be used to identify projected attack paths between users and compromise events (e.g., full tenant compromise, or other types of compromise events described herein). As used herein, "projected" attack paths may refer to attack paths that are identified as being possible by the autonomous pentesting agent 105 without actual performance of the attack during an autonomous pentest. An example of a projected attack path is described in further detail elsewhere herein, including with reference to FIG. 5.

In some examples, the autonomous pentesting agent 105 may identify a shortest attack path between each user and a given compromise event (e.g., impact). For example, from the projected attack paths, the autonomous pentesting agent 105 may identify shortest attack paths to each compromise event. As used herein, a "shortest" path may refer to an attack path having a lowest quantity of network assets (e.g., objects) exploited to achieve the compromise event.

The autonomous pentesting agent 105 may, based on projecting the attack paths, assign risk scores to each user. For example, the autonomous pentesting agent 105 may assign a risk score 415-*a* to the user 405-*a*, a risk score 415-*b* to the user 405-*b*, a risk score 415-*c* to the user 405-*c*, a risk score 415-*d* to the user 405-*d*, a risk score 415-*e* to the user 405-*e*, a risk score 415-*f* to the user 405-*f*, and a risk score 415-*g* to the user 405-*g*. A risk score assigned to a respective user may be based on complexity of one or more projected attack paths from the user to one or more compromise events, length of the one or more projected attack paths, severity levels of the one or more compromise events, or both.

For example, complexity of an attack path may refer to a probability of success in compromising network assets along the attack path. That is, when an attack path is more complex, it may involve access to one or more network assets that is relatively more difficult to obtain than network assets in an attack path that is relatively less complex. The autonomous pentesting agent 105 may assign lower risk scores to users that have one or more projected attack paths that are relatively more complex than projected attack paths of other users.

A length of an attack path may refer to a quantity of network assets exploited to achieve the compromise event. In some examples, the autonomous pentesting agent 105 may assign lower risk scores to longer attack paths. That is, a projected attack path involving more steps (e.g., accessing more resources) than another projected attack path may pose less of a security risk if the steps along each projected attack path are associated with a same complexity.

A severity level of a compromise event may refer to a security impact to the cloud environment 400 if the compromise event were to occur. As an example, a full tenant compromise may be a highest severity level, while compromise of a social media account may be a relatively lower severity level. The autonomous pentesting agent 105 may assign higher risk scores to users having projected attack paths that have higher severity levels compared to projected attack paths of other users.

In some examples, the autonomous pentesting agent 105 may assign the risk scores based on shortest projected attack paths of the respective users. For example, the autonomous pentesting agent 105 may identify, for each user, a shortest path of multiple projected paths to a compromise event, and the risk score for the user may be based on complexity, length, and severity of that shortest attack path. Alternatively, the autonomous pentesting agent 105 may assign the risk scores based on more than one projected attack path. For example, the autonomous pentesting agent 105 may update a risk score assigned to the user after identifying a new projected attack path stemming from the user during an autonomous pentest such that, at the end of the autonomous pentest, the risk score is indicative of all projected attack paths identified for the user.

The autonomous pentesting agent 105 may output a network assessment report indicating security information that is based on the risk scores. As an example, the autonomous pentesting agent 105 may output a notification that indicates risk scores exceeding a threshold level of risk configured for the cloud environment 400. In some examples, the network assessment report may include one or more recommendations. For example, the autonomous pentesting agent 105 may recommend implementation of a security mitigation at one or more users, one or more computing assets, or both of the cloud environment 400. Additionally, or alternatively, the autonomous pentesting agent 105 may recommend removal of one or more access privileges for one or more users, such access privileges that were found to lead to relatively severe compromise events in projected attack paths.

In some examples, the autonomous pentesting agent 105 may compare risk scores of users across multiple autonomous pentests. For example, the autonomous pentesting agent 105 may perform a second autonomous pentest after implementation of a security mitigation, a change to access privileges of one or more users, or both (e.g., recommended or otherwise). In such examples, the autonomous pentesting agent 105 may output the network assessment report indicating changes between the autonomous pentests, including whether risk scores of users subject to the security mitigations or changes to access privileges decreased.

Additionally, or alternatively, the autonomous pentesting agent 105 may compare risk scores of users across a first pentest that is based on configured access privileges of users and a second pentest that is based on in-use access privileges of users. For example, the autonomous pentesting agent 105 may identify or receive an indication as input of a set of privileges that are in-use by respective users of the cloud environment 400. Based on the in-use privileges, the autonomous pentesting agent 105 may perform another autonomous pentest of the cloud environment 400 and compare risk scores across the autonomous pentests. In some examples, the autonomous pentesting agent 105 may recommend removal of one or more access privileges based on the access privileges not being in-use by a user (e.g., being absent from the set of in-use privileges) and/or based on an association of the access privileges with a relatively high risk score. In such examples, comparing the risk scores across computing environments having configured privileges with in-use privileges may support identification and removal of misconfigured privileges.

Figure 5:
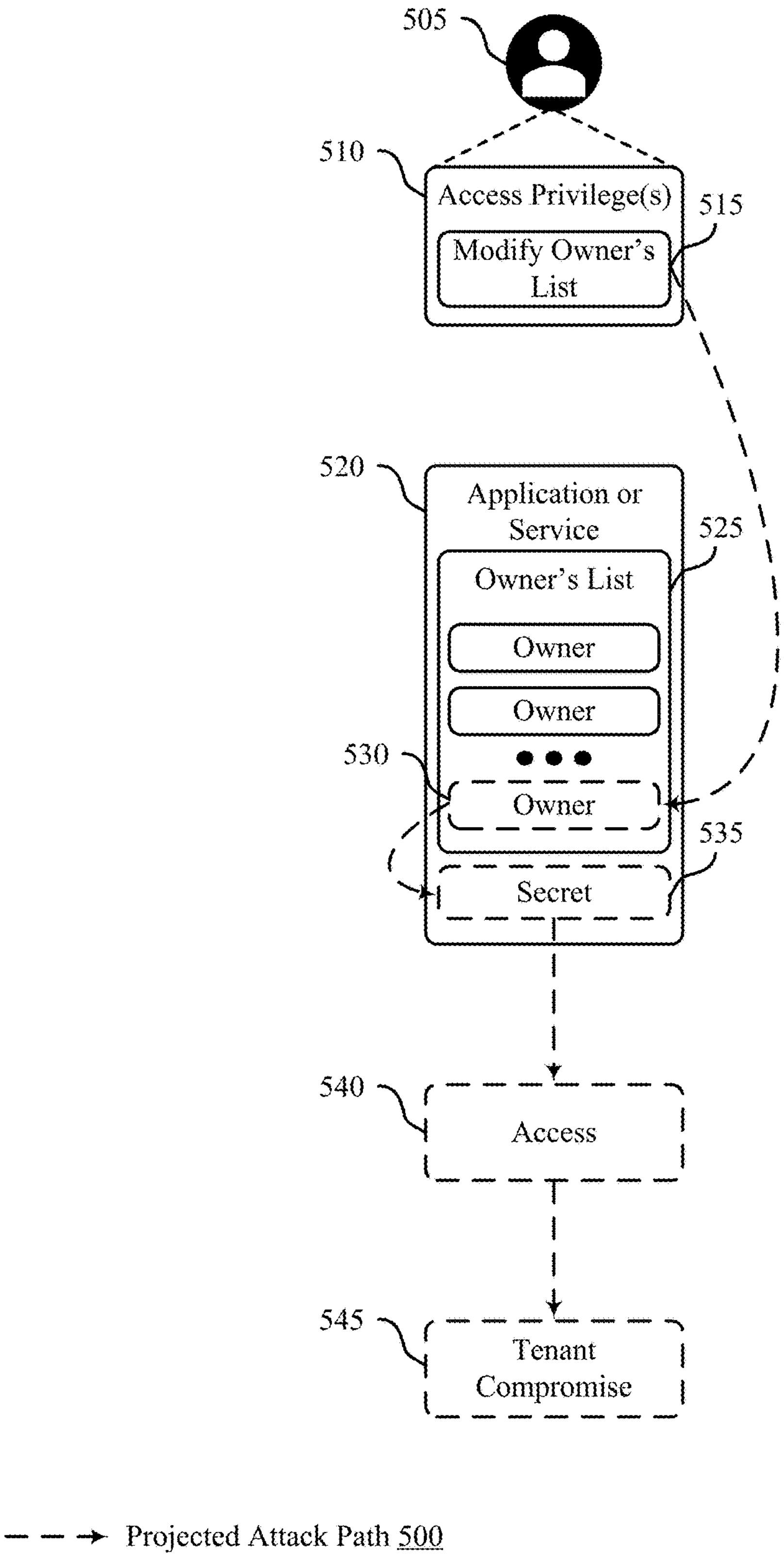
FIG. 5 shows an example of a projected attack path that supports risk score generation in cloud environments in accordance with aspects of the present disclosure.

FIG. 5 shows an example of a projected attack path 500 that supports risk score generation in cloud environments in accordance with aspects of the present disclosure. The projected attack path 500 may implement or be implemented by the computing environment 100, the autonomous pentest map 200, the computing environment 300, the cloud environment 400, or any combination thereof. For example, the projected attack path 500 may illustrate a projection of an attack path generated an autonomous pentesting agent during an autonomous pentest of a network.

The autonomous pentesting agent may gain unauthorized access to the user 505 or another user by which the autonomous pentesting agent may identify access privilege(s) 510 of the user 505. That is, through directly gaining unauthorized access to the user 505 or by gaining unauthorized access to a different user having read privileges to view the user 505 and the access privilege(s) 510 of the user 505, the autonomous pentesting agent may identify the access privilege(s) 510 of the user 505 and determine a projected attack path 550. In some examples, the autonomous pentesting agent may receive user inputs (e.g., prior to the autonomous pentest) indicating users having the read privileges, such as in a request to perform risk assessment based on the read privileges. That is, in some examples, the autonomous pentesting agent may use the read privileges based on a user input (e.g., rather than through gaining unauthorized access and/or discovering the read privileges during the autonomous pentest). For example, operations described with respect to FIG. 5 may refer to projected operations of the autonomous pentesting agent, such as an attack path that the autonomous pentesting agent is capable of performing (e.g., but may not actually perform) to achieve a compromise event.

The projected attack path 550 may include using an access privilege of the user 505 to modify an owner's list 515. For example, the access privilege(s) 510 of the user 505 may include a privilege to modify an owner's list 515 of an application or service 520. The autonomous pentesting agent may use this privilege to add an owner 530 to the owner's list 525 using the access privilege(s) 510 of the user 505.

After adding the owner 530, the autonomous pentesting agent may add a secret 535 to the application or service 520. For example, the autonomous pentesting agent may add the secret 535 such that the autonomous pentesting agent may use the secret 535 to provide access 540, such as access to a network asset (e.g., a same or different application or service). Adding the secret may involve identification of a service principal, an attempt to add the secret 535 to the service principal (e.g., which may have a probability of failure), and verification that the secret 535 provides the access 540. If the autonomous pentesting agent successfully adds the secret 535, the autonomous pentesting agent may use the access 540 that is obtained via adding the secret 535 to obtain tenant compromise 545.

Because adding the secret 535 involves several operations, some having probability of failure, the projected attack path 550 that includes adding the secret 535 may be associated with a relatively high complexity level. That is, when generating a risk score for the user 505, the projected attack path 550 may be associated with a lower risk score in accordance with adding the secret 535 having a higher complexity level. Put another way, the relatively high complexity level of adding the secret may contribute to a reduction in the risk score (e.g., weight the risk score to be lower) for the user 505 having the projected attack path 550.

Figure 6:
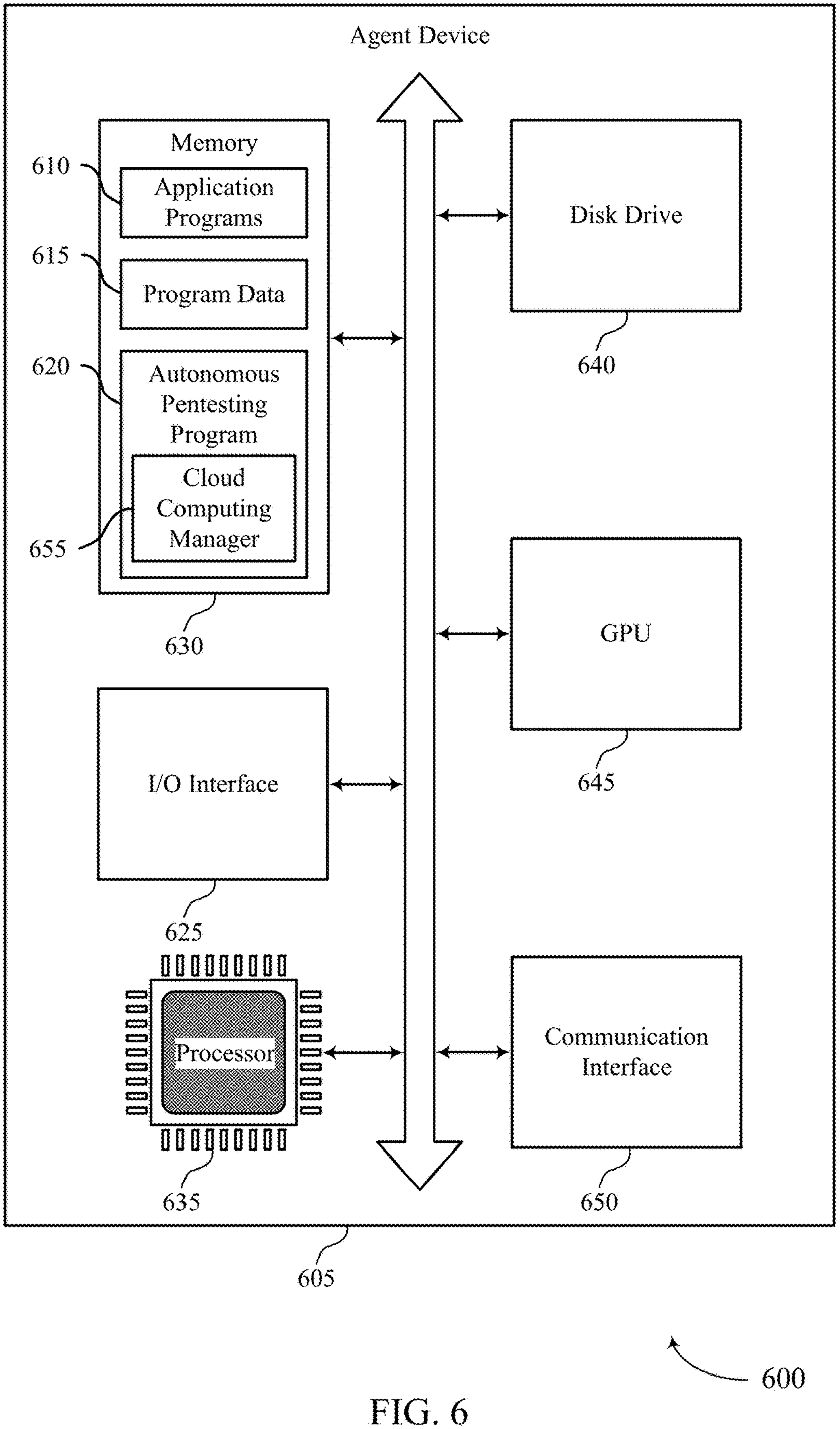
FIG. 6 shows a diagram of a system including a device that supports risk score generation in cloud environments in accordance with aspects of the present disclosure.

FIG. 6 shows a diagram of a system 600 including an agent device 605 that supports risk score generation in cloud environments in accordance with aspects of the present disclosure. The agent device 605 may be an example of a device or server on which an autonomous pentesting agent 105 is deployed as described herein. The agent device 605 may include components for risk score generation in cloud environments, such as a memory 630 including application programs 610, program data 615, an autonomous pentesting program 620, and a cloud manager 655; an input/output (I/O) interface 625; a processor 635; a disk drive 640; a graphics processing unit (GPU) 645; and a communication interface 650. Each of these components may communicate, directly or indirectly, with one another (e.g., via one or more buses, communications links, communications interfaces, or any combination thereof).

The I/O interface 625 may support connection of the agent device 605 with one or more other devices. For example, the agent device 605 may connect to keyboards, mice, printers, hard disks, or the like via the I/O interface 625. The I/O interface 625 may communicate with the processor 635. That is, the processor 635 may process signals from devices connected to the agent device 605 via the I/O interface 625.

Memory 630 may include RAM, ROM, or both. The memory 630 may store computer-readable, computer-executable software including instructions that, when executed, cause at least one processor 635 to perform various functions described herein, such as functions supporting risk score generation in cloud environments. In some cases, the memory 630 may contain, among other things, a basic input/output system (BIOS), which may control basic hardware or software operation such as the interaction with peripheral components or devices. The memory 630 may be an example of a single memory or multiple memories. For example, the agent device 605 may include one or more memories 630.

The application programs 610 in the memory 630 may be examples of app(s) 140 as described with reference to FIG. 1. For example, the application programs 610 may be installed on the memory 630 of the agent device 605, among other devices in a network. The application programs 610 may be examples of software applications or computer programs that are implemented to carry out one or more functions or tasks.

The program data 615 may be data related to the application programs 610. Program data 615 may be an example of or refer to running data of programs and applications installed on the memory 630 of the agent device 605. In some examples, the program data 615 may include various data, including code that allows the application programs 610 to perform the one or more functions or tasks.

The processor 635 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 635 may be configured to execute computer-readable instructions stored in at least one memory 630 to perform various functions (e.g., functions or tasks supporting risk score generation in cloud environments). Though a single processor 635 is depicted in the example of FIG. 6, it is to be understood that the system 600 may include any quantity of one or more of processors 635 and that a group of processors 635 may collectively perform one or more functions ascribed herein to a processor, such as the processor 635. The processor 635 may be an example of a single processor or multiple processors. For example, the agent device 605 may include one or more processors 635.

The disk drive 640 may be configured to store data that is generated, processed, stored, or otherwise used by the system 600. In some cases, the disk drive 640 may include one or more hard disk drives (HDDs), one or more solid-state drives (SSDs), or both. In some examples, the disk drive 640 may be an example of a single database, a distributed database, multiple distributed databases, a data store, a data lake, or an emergency backup database. In some examples, the disk drive 640 may be an example of one or more components described with reference to FIG. 1.

GPU 645 may be configured to store graphics-related data. The GPU 645 may store and manage data related to graphics and video processing. In some examples, the GPU 645 may be an example of or a component of a graphics card. The GPU 645 may use components of the memory 630, including the RAM, for temporary storage. For example, the GPU 645 may move data from the RAM of the memory 630 to the GPU 645 for graphics and video processing.

The communication interface 650 may enable the agent device 605 to exchange information (e.g., input information, output information, or both) with other systems or devices (not shown). For example, the communication interface 650 may enable the agent device 605 to connect to a network (e.g., a network 110 as described herein). The communication interface 650 may include one or more wireless network interfaces, one or more wired network interfaces, or any combination thereof.

The autonomous pentesting program 620 may be an example of a program of an autonomous pentesting service that is installed on the memory 630 of the agent device 605. The autonomous pentesting program 620 may execute an autonomous pentest of a network accessed by the agent device 605, such as accessed via the communication interface 650. That is, the autonomous pentesting program 620 may be configured to perform an autonomous pentest as described herein, including an autonomous pentest involving risk score generation in a cloud environment.

The cloud manager 655 may support risk score generation in a cloud environment in accordance with examples as disclosed herein. For example, the cloud manager 655 may be configured as or otherwise support a means for generating, during an autonomous penetration test of a network associated with the cloud environment, a visual representation of relationships between a plurality of users in the cloud environment and of respective access privileges for each of the plurality of users, the respective access privileges indicating access to a plurality of network assets of the network by respective users via the cloud environment. The cloud manager 655 may be configured as or otherwise support a means for generating, during the autonomous penetration test of the cloud environment and without compromising the plurality of users, a plurality of risk scores for the plurality of users, wherein each risk score is based at least in part on a projected attack path from a respective user to a compromise event and on a severity of the compromise event. The cloud manager 655 may be configured as or otherwise support a means for outputting a network assessment report indicating security information of the cloud environment based at least in part on the plurality of risk scores for the plurality of users.

By including or configuring the cloud manager 655 in accordance with examples as described herein, the agent device 605 may support techniques for improved network security.

Figure 7:
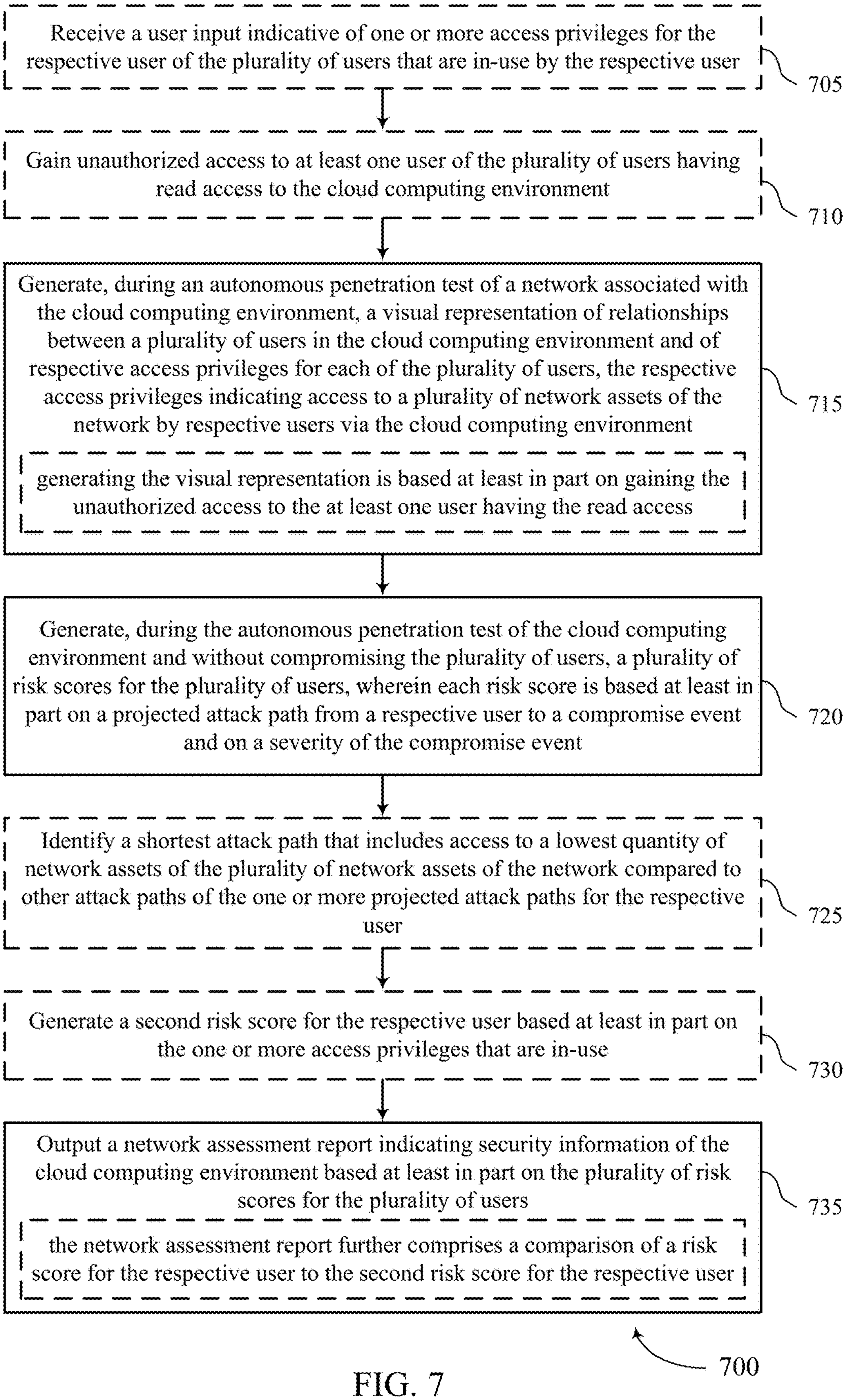
FIG. 7 shows a flowchart illustrating methods that support risk score generation in cloud environments in accordance with aspects of the present disclosure.

FIG. 7 shows a flowchart illustrating a method 700 that supports risk score generation in cloud environments in accordance with aspects of the present disclosure. The operations of the method 700 may be implemented by an agent device 705 or its components as described herein. In some examples, an agent device may execute a set of instructions to control the functional elements of the agent device to perform the described functions. Additionally, or alternatively, the agent device may perform aspects of the described functions using special-purpose hardware.

At 705, the method may include receiving a user input indicative of one or more access privileges for the respective user of the plurality of users that are in-use by the respective user. The operations of 705 may be performed in accordance with examples as disclosed herein.

At 710, the method may include gaining unauthorized access to at least one user of the plurality of users having read access to the cloud environment, wherein generating the visual representation is based at least in part on gaining the unauthorized access to the at least one user having the read access. The operations of 710 may be performed in accordance with examples as disclosed herein.

At 715, the method may include generating, during an autonomous penetration test of a network associated with the cloud environment, a visual representation of relationships between a plurality of users in the cloud environment and of respective access privileges for each of the plurality of users, the respective access privileges indicating access to a plurality of network assets of the network by respective users via the cloud environment. The operations of 715 may be performed in accordance with examples as disclosed herein.

At 720, the method may include generating, during the autonomous penetration test of the cloud environment and without compromising the plurality of users, a plurality of risk scores for the plurality of users, wherein each risk score is based at least in part on a projected attack path from a respective user to a compromise event and on a severity of the compromise event. The operations of 720 may be performed in accordance with examples as disclosed herein.

At 725, the method may include identifying the shortest attack path that includes access to a lowest quantity of network assets of the plurality of network assets of the network compared to other attack paths of the one or more projected attack paths for the respective user. The operations of 725 may be performed in accordance with examples as disclosed herein.

At 730, the method may include generating a second risk score for the respective user based at least in part on the one or more access privileges that are in-use, wherein the network assessment report further comprises a comparison of a risk score for the respective user to the second risk score for the respective user. The operations of 730 may be performed in accordance with examples as disclosed herein.

At 735, the method may include outputting a network assessment report indicating security information of the cloud environment based at least in part on the plurality of risk scores for the plurality of users. The operations of 735 may be performed in accordance with examples as disclosed herein.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The following provides an overview of aspects of the present disclosure:

Aspect 1: A method for weighted risk score generation in a cloud environment, comprising: generating, during an autonomous penetration test of a network associated with the cloud environment, a visual representation of relationships between a plurality of users in the cloud environment and of respective access privileges for each of the plurality of users, the respective access privileges indicating access to a plurality of network assets of the network by respective users via the cloud environment; generating, during the autonomous penetration test of the cloud environment and without compromising the plurality of users, a plurality of risk scores for the plurality of users, wherein each risk score is based at least in part on a projected attack path from a respective user to a compromise event and on a severity of the compromise event; and outputting a network assessment report indicating security information of the cloud environment based at least in part on the plurality of risk scores for the plurality of users.

Aspect 2: The method of aspect 1, further comprising: gaining unauthorized access to at least one user of the plurality of users having read access to the cloud environment, wherein generating the visual representation is based at least in part on gaining the unauthorized access to the at least one user having the read access.

Aspect 3: The method of any of aspects 1 through 2, wherein the projected attack path comprises a shortest attack path of one or more projected attack paths for the respective user, the method further comprising: identifying the shortest attack path that includes access to a lowest quantity of network assets of the plurality of network assets of the network compared to other attack paths of the one or more projected attack paths for the respective user.

Aspect 4: The method of any of aspects 1 through 3, wherein each risk score is based at least in part on a respective complexity of access to one or more network assets within the projected attack path.

Aspect 5: The method of any of aspects 1 through 4, wherein each risk score corresponds to a plurality of projected attack paths from the respective user to a plurality of compromise events, the plurality of projected attack paths comprising the projected attack path and the plurality of compromise events comprising the compromise event.

Aspect 6: The method of any of aspects 1 through 5, further comprising: receiving a user input indicative of one or more access privileges for the respective user of the plurality of users that are in-use by the respective user; and generating a second risk score for the respective user based at least in part on the one or more access privileges that are in-use, wherein the network assessment report further comprises a comparison of a risk score for the respective user to the second risk score for the respective user.

Aspect 7: The method of aspect 6, wherein the network assessment report further comprises a recommendation for removal of at least one access privilege for the respective user in accordance with the comparison.

Aspect 8: The method of any of aspects 1 through 7, further comprising: storing the visual representation on a temporary server that is generated in accordance with securely storing the visual representation during the autonomous penetration test; accessing the stored visual representation via the temporary server to generate the plurality of risk scores; and destroying the temporary server after outputting the network assessment report.

Aspect 9: The method of any of aspects 1 through 8, wherein generating the visual representation comprises: generating a first portion of the visual representation using a first portion of data that is indicative of the relationships between the plurality of users and the respective access privileges; and generating at least one second portion of the visual representation using at least one second portion of the data, wherein the visual representation comprises the first portion and the at least one second portion, and wherein the first portion of the data and the at least one second portion of the data satisfy a threshold data size.

Aspect 10: The method of any of aspects 1 through 9, further comprising: performing, after implementation of at least one security operation that is in accordance with the network assessment report, a second autonomous penetration test of the network associated with the cloud environment; generating an updated plurality of risk scores for the plurality of users; and outputting an updated network assessment report indicative of a comparison between the plurality of risk scores and the updated plurality of risk scores.

Aspect 11: The method of any of aspects 1 through 10, wherein the visual representation comprises a graph or a map.

Aspect 12: An apparatus for weighted risk score generation in a cloud environment, comprising one or more memories storing processor-executable code, and one or more processors coupled with the one or more memories and individually or collectively operable to execute the code to cause the apparatus to perform a method of any of aspects 1 through 11.

Aspect 13: An apparatus for weighted risk score generation in a cloud environment, comprising at least one means for performing a method of any of aspects 1 through 11.

Aspect 14: A non-transitory computer-readable medium storing code for weighted risk score generation in a cloud environment, the code comprising instructions executable by one or more processors to perform a method of any of aspects 1 through 11.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for weighted risk score generation in a cloud environment, comprising:

generating, during an autonomous penetration test of a network associated with the cloud environment, a visual representation of relationships between a plurality of users in the cloud environment and of respective access privileges for each of the plurality of users, the respective access privileges indicating access to a plurality of network assets of the network by respective users via the cloud environment;

generating, during the autonomous penetration test of the cloud environment and without compromising the plurality of users, a plurality of risk scores each associated with one of the plurality of users, wherein each risk score is based at least in part on a projected attack path from a respective user to a compromise event and on a severity of the compromise event; and outputting a network assessment report indicating security information of the cloud environment based at least in part on the plurality of risk scores each associated with one of the plurality of users.

2. The method of claim 1, further comprising:

gaining unauthorized access to at least one user of the plurality of users having read access to the cloud environment, wherein generating the visual representation is based at least in part on gaining the unauthorized access to the at least one user having the read access.

3. The method of claim 1, wherein the projected attack path comprises a shortest attack path of one or more projected attack paths for the respective user, the method further comprising:

identifying the shortest attack path that includes access to a lowest quantity of network assets of the plurality of network assets of the network compared to other attack paths of the one or more projected attack paths for the respective user.

4. The method of claim 1, wherein each risk score is based at least in part on a respective complexity of access to one or more network assets within the projected attack path.

5. The method of claim 1, wherein each risk score corresponds to a plurality of projected attack paths from the respective user to a plurality of compromise events, the plurality of projected attack paths comprising the projected attack path and the plurality of compromise events comprising the compromise event.

6. The method of claim 1, further comprising:

receiving a user input indicative of one or more access privileges for the respective user of the plurality of users that are in-use by the respective user; and generating a second risk score for the respective user based at least in part on the one or more access privileges that are in-use, wherein the network assessment report further comprises a comparison of a risk score for the respective user to the second risk score for the respective user.

7. The method of claim 6, wherein the network assessment report further comprises a recommendation for removal of at least one access privilege for the respective user in accordance with the comparison.

8. The method of claim 1, further comprising:

storing the visual representation on a temporary server that is generated in accordance with securely storing the visual representation during the autonomous penetration test;

accessing the stored visual representation via the temporary server to generate the plurality of risk scores; and destroying the temporary server after outputting the network assessment report.

9. The method of claim 1, wherein generating the visual representation comprises:

generating a first portion of the visual representation using a first portion of data that is indicative of the relationships between the plurality of users and the respective access privileges; and generating at least one second portion of the visual representation using at least one second portion of the data, wherein the visual representation comprises the first portion and the at least one second portion, and wherein the first portion of the data and the at least one second portion of the data satisfy a threshold data size.

10. The method of claim 1, further comprising:

performing, after implementation of at least one security operation that is in accordance with the network assessment report, a second autonomous penetration test of the network associated with the cloud environment;

generating an updated plurality of risk scores for the plurality of users; and outputting an updated network assessment report indicative of a comparison between the plurality of risk scores and the updated plurality of risk scores.

11. The method of claim 1, wherein the visual representation comprises a graph or a map.

12. An apparatus for weighted risk score generation in a cloud environment, comprising:

one or more memories storing processor-executable code; and one or more processors coupled with the one or more memories and individually or collectively operable to execute the code to cause the apparatus to:

generate, during an autonomous penetration test of a network associated with the cloud environment, a visual representation of relationships between a plurality of users in the cloud environment and of respective access privileges for each of the plurality of users, the respective access privileges indicating access to a plurality of network assets of the network by respective users via the cloud environment;

generate, during the autonomous penetration test of the cloud environment and without compromising the plurality of users, a plurality of risk scores each associated with one of the plurality of users, wherein each risk score is based at least in part on a projected attack path from a respective user to a compromise event and on a severity of the compromise event; and output a network assessment report indicating security information of the cloud environment based at least in part on the plurality of risk scores each associated with one of the plurality of users.

13. The apparatus of claim 12, wherein the one or more processors are individually or collectively further operable to execute the code to cause the apparatus to:

gain unauthorized access to at least one user of the plurality of users having read access to the cloud environment, wherein generating the visual representation is based at least in part on gaining the unauthorized access to the at least one user having the read access.

14. The apparatus of claim 12, wherein the projected attack path comprises a shortest attack path of one or more projected attack paths for the respective user, and the one or more processors are individually or collectively further operable to execute the code to cause the apparatus to:

identify the shortest attack path that includes access to a lowest quantity of network assets of the plurality of network assets of the network compared to other attack paths of the one or more projected attack paths for the respective user.

15. The apparatus of claim 12, wherein each risk score is based at least in part on a respective complexity of access to one or more network assets within the projected attack path.

16. The apparatus of claim 12, wherein each risk score corresponds to a plurality of projected attack paths from the respective user to a plurality of compromise events, the plurality of projected attack paths comprising the projected attack path and the plurality of compromise events comprising the compromise event.

17. A non-transitory computer-readable medium storing code for weighted risk score generation in a cloud environment, the code comprising instructions executable by one or more processors to:

generate, during an autonomous penetration test of a network associated with the cloud environment, a visual representation of relationships between a plurality of users in the cloud environment and of respective access privileges for each of the plurality of users, the respective access privileges indicating access to a plurality of network assets of the network by respective users via the cloud environment;

generate, during the autonomous penetration test of the cloud environment and without compromising the plurality of users, a plurality of risk scores each associated with one of the plurality of users, wherein each risk score is based at least in part on a projected attack path from a respective user to a compromise event and on a severity of the compromise event; and output a network assessment report indicating security information of the cloud environment based at least in part on the plurality of risk scores each associated with one of the plurality of users.

18. The non-transitory computer-readable medium of claim 17, wherein the instructions are further executable by the one or more processors to:

receive a user input indicative of one or more access privileges for the respective user of the plurality of users that are in-use by the respective user; and generate a second risk score for the respective user based at least in part on the one or more access privileges that are in-use, wherein the network assessment report further comprises a comparison of a risk score for the respective user to the second risk score for the respective user.

19. The non-transitory computer-readable medium of claim 18, wherein the network assessment report further comprises a recommendation for removal of at least one access privilege for the respective user in accordance with the comparison.

20. The non-transitory computer-readable medium of claim 17, wherein the instructions are further executable by the one or more processors to:

store the visual representation on a temporary server that is generated in accordance with securely storing the visual representation during the autonomous penetration test;

access the stored visual representation via the temporary server to generate the plurality of risk scores; and destroy the temporary server after outputting the network assessment report.

* * * * *